United States Patent

Iordache et al.

(10) Patent No.: US 9,316,775 B2
(45) Date of Patent: Apr. 19, 2016

(54) LIGHT ASSEMBLY WITH LIGHT GUIDE

(71) Applicant: Tyco Electronics Canada ULC, Markham (CA)

(72) Inventors: Lucian Iordache, Woodbridge (CA); Andras Gyimes, Toronto (CA)

(73) Assignee: Tyco Electronics Canada ULC, Markham (CA)

( * ) Notice: Subject to any disclaimer, the term of this patent is extended or adjusted under 35 U.S.C. 154(b) by 61 days.

(21) Appl. No.: 14/172,189

(22) Filed: Feb. 4, 2014

(65) Prior Publication Data

US 2015/0219818 A1 Aug. 6, 2015

(51) Int. Cl.
| | |
|---|---|
| *F21V 8/00* | (2006.01) |
| *F21S 10/02* | (2006.01) |
| *G02B 6/06* | (2006.01) |
| *F21S 10/00* | (2006.01) |
| *B60Q 1/34* | (2006.01) |
| *B60Q 3/00* | (2006.01) |
| *F21S 8/10* | (2006.01) |

(52) U.S. Cl.
CPC .......... *G02B 6/0008* (2013.01); *B60Q 1/34* (2013.01); *B60Q 3/004* (2013.01); *F21S 10/005* (2013.01); *F21S 48/2237* (2013.01); *F21S 48/2243* (2013.01); *F21S 48/2268* (2013.01); *F21S 48/2281* (2013.01); *G02B 6/001* (2013.01); *G02B 6/0018* (2013.01); *G02B 6/0028* (2013.01); *G02B 6/0055* (2013.01); *G02B 6/0061* (2013.01); *G02B 6/0068* (2013.01); *G02B 6/06* (2013.01); *B60Q 2400/20* (2013.01)

(58) Field of Classification Search
CPC ....... F21S 10/005; F21S 10/02; F21S 10/023; F21W 2121/00; F21W 2121/004; G02B 6/001; G02B 6/0018; G02B 6/0028; G02B 6/0055; G02B 6/006; G02B 6/04; G02B 6/06; G02B 6/08
See application file for complete search history.

(56) References Cited

U.S. PATENT DOCUMENTS

| | | | |
|---|---|---|---|
| 6,031,958 A | 2/2000 | McGaffigan | |
| 8,070,343 B2 | 12/2011 | Goto et al. | |
| 8,147,110 B2 | 4/2012 | Goto et al. | |
| 8,441,602 B2 | 5/2013 | Kim et al. | |
| 2004/0052089 A1* | 3/2004 | Coto et al. | 362/551 |
| 2007/0058388 A1* | 3/2007 | Takatori et al. | 362/554 |
| 2009/0190370 A1 | 7/2009 | Luecke et al. | |
| 2009/0237954 A1 | 9/2009 | Goto et al. | |

FOREIGN PATENT DOCUMENTS

WO 00/17572 A1 3/2000

OTHER PUBLICATIONS

International Search Report, International Application No. PCT/US2015/013483, International Filing Date, Jan. 29, 2015.

\* cited by examiner

*Primary Examiner* — Karabi Guharay
*Assistant Examiner* — Steven Horikoshi

(57) ABSTRACT

A light assembly is provided that includes a light guide, multiple light pipes, and multiple light sources. The light guide has an elongated body extending along a longitudinal axis. The light guide includes multiple segments arranged axially along a length of the body. Each segment has a light receiving region and a light emitting region. The light pipes are disposed along the light receiving regions and extend parallel to the longitudinal axis. Each of the multiple light sources is optically coupled to an attachment end of a corresponding light pipe. The light emitted by each light source is received by the corresponding light pipe at the attachment end and transmitted through the light pipe towards a distal end of the light pipe. Adjacent segments of the light guide receive light from different light pipes and emit such light from the light guide through the corresponding light emitting regions.

20 Claims, 5 Drawing Sheets

LIGHT ASSEMBLY WITH LIGHT GUIDE

BACKGROUND OF THE INVENTION

The subject matter herein relates generally to light assemblies.

Some known lighting applications call for a dynamic light effect, in which various positions along a defined length are illuminated in a sequence over time. For example, a first location may be illuminated at time X, then a second location that is adjacent to the first location may be illuminated at time X+1 while the first location is darkened. Next, at time X+2, the second location may be darkened while a third location adjacent to the second location is illuminated. The dynamic light effect may provide the appearance that one or more light sources emitting light are physically traveling along the defined length, when in actuality the light sources are stationary. Dynamic light effects, with the appearance of moving lights, tend to attract the attention of persons nearby. As such, these dynamic light effects may be utilized for aesthetic purposes as well as for practical purposes, such as to provide a warning signal (e.g., a turn signal in an automobile). The dynamic light effect may be customized by changing the color and luminance (e.g., luminosity) of the light emitted by the light sources, the distance between the locations that are illuminated, and the timing that the light sources are illuminated.

In typical known lighting assemblies that provide dynamic light effects, the light sources are spaced along the defined length at each of the locations to be illuminated in the sequence. For example, a light assembly that includes light emitting diodes (LEDs) to provide a dynamic light effect along a length of three feet with LEDs located at every inch would require roughly thirty-six LEDs. Each of the thirty-six LEDs requires connection to a power source and each LED must be timed in sequence with the other LEDs. As the length of the lighting assemblies increase to provide longer dynamic light effects, the cost and space requirements for the multitude of LEDs and associated components (e.g., wires, power sources, etc.) may be prohibitively high.

Some current lighting applications utilize a light pipe with a light source to distribute the light generated by the light source over a distance. Such lighting applications may include, for example, automotive interior ambient lighting, automotive exterior lighting, commercial lighting, lighting in household devices, and the like. The light pipe is typically a cylindrical, transparent structure. The light pipe may be aligned with the light source such that the light source is located at an end of the light pipe. The light generated by the light source is received at the end of the light pipe and transmitted longitudinally along the length of the light pipe by internal reflection. The light may be emitted from the surface of the light pipe along the length of the light pipe in a direction transverse to the longitudinal direction of the light pipe. In addition, or alternatively, the light may be emitted in an axial direction through a distal end of the light pipe opposite to the end that receives the light from the light source. The use of light pipes allows for the transmission of light over a distance using only a single light source at an end of the light pipe instead of multiple light sources spaced apart along a defined length.

Known light assemblies have not utilized light pipes to provide a dynamic light effect. Sequencing multiple light sources that are each optically coupled to corresponding light pipes merely illuminates the light pipes one at a time. If the multiple light pipes are aligned side by side along a defined length of the light assembly, then illuminating the light pipes one at a time may provide a color-changing effect as the different light sources are sequenced but not a dynamic light effect that appears as if the light is traveling along the length of the light assembly. A need remains for a light assembly that effectively utilizes light pipes to provide a dynamic light effect over a variable distance using few light sources.

BRIEF DESCRIPTION OF THE INVENTION

In an embodiment, a light assembly includes a light guide, multiple light pipes, and multiple light sources. The light guide has an elongated body extending along a longitudinal axis between a first end and an opposing second end. The light guide includes multiple segments that are arranged axially along a length of the body between the first and second ends. The segments alternate along the length. Each segment has a light receiving region and a light emitting region. The multiple light pipes are each elongated between an attachment end and an opposing distal end. The light pipes are disposed along the light receiving regions of the light guide and extend parallel to the longitudinal axis. The multiple light sources are configured to emit light. Each light source is optically coupled to the attachment end of a corresponding one of the light pipes. The light emitted by each light source is received by the corresponding light pipe at the attachment end and transmitted through the light pipe towards the distal end. Adjacent segments of the light guide receive light from different light pipes and emit such light from the light guide through the corresponding light emitting regions.

In an embodiment, a light assembly includes a light guide and multiple light pipes. The light guide has an elongated body extending along a longitudinal axis between a first end and an opposing second end. The light guide includes multiple segments that are arranged axially along a length of the body between the first and second ends. The segments include right-side segments, left-side segments, and top-side segments that alternate along the length. Each segment has a light receiving region and a light emitting region. The right-side segments have the light receiving region along a right side of the light guide. The left-side segments have the light receiving region along a left side of the light guide. The top-side segments have the light receiving region along a top side of the light guide. The multiple light pipes are each elongated between an attachment end and an opposing distal end. The light pipes are disposed along the light receiving regions of the light guide and extend parallel to the longitudinal axis. The light pipes each receive light generated by a different light source at the attachment end and transmit the light through the light pipe towards the distal end. Adjacent segments of the light guide receive light from different light pipes and emit such light from the light guide through the corresponding light emitting region.

DETAILED DESCRIPTION OF THE INVENTION

One or more embodiments of the subject matter described herein provide a light assembly with multiple light pipes and a light guide. The light assembly is configured to provide a dynamic light effect along defined path.

Figure 1:
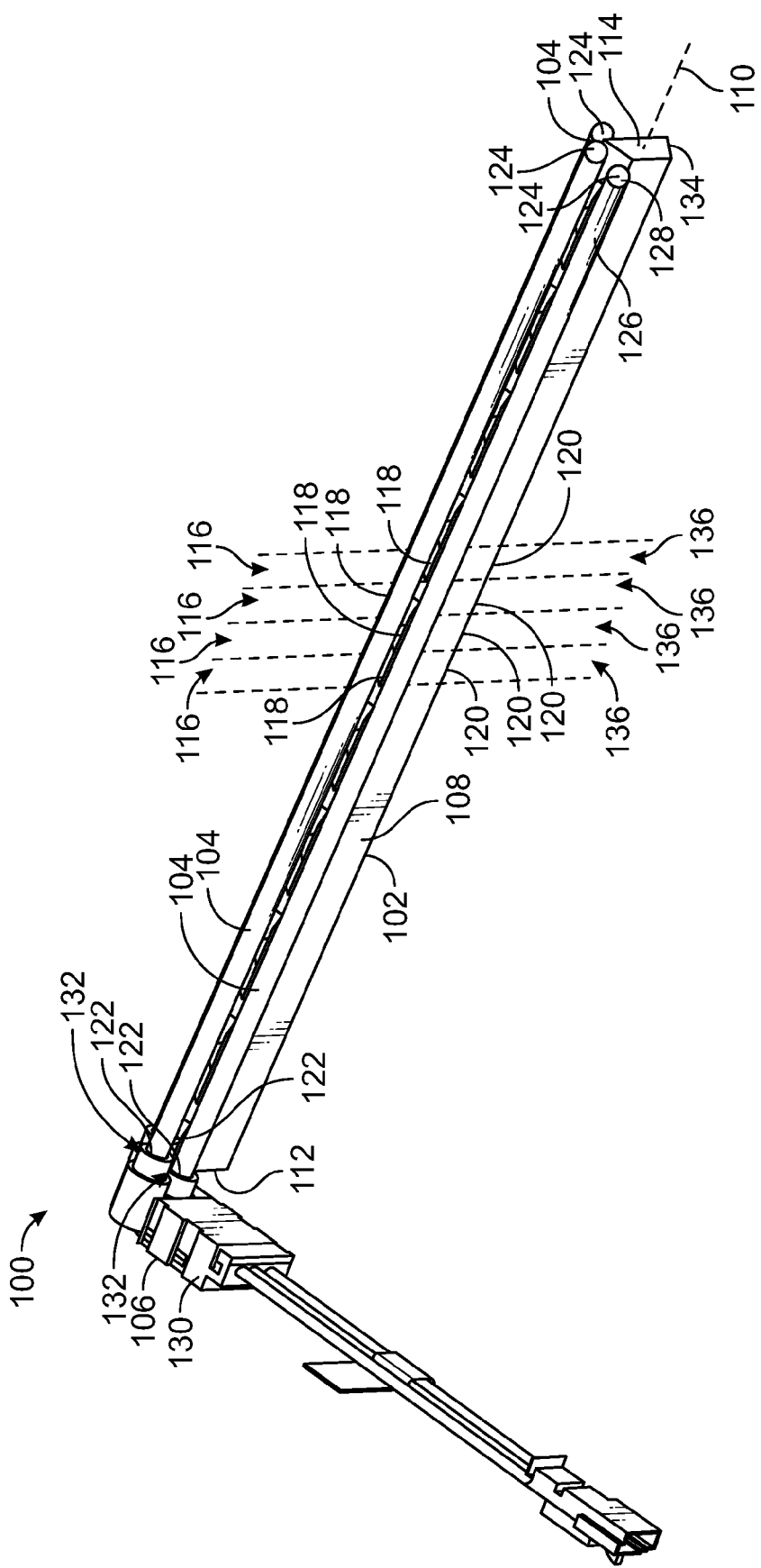
FIG. 1 is a perspective view of a light assembly formed in accordance with an exemplary embodiment.

FIG. 1 is a perspective view of a light assembly 100 formed in accordance with an exemplary embodiment. The light assembly 100 includes a light guide 102, multiple light pipes 104, and a connector 106. The light guide 102 has an elongated body 108 that extends along a longitudinal axis 110 between a first end 112 and a second end 114. The second end 114 opposes the first end 112. The light guide 102 may be formed of a light transmissive material. In an exemplary embodiment, the light guide 102 includes multiple segments 116 that are arranged axially along a length of the body 108 between the first and second ends 112, 114. The segments 116 each have a light receiving region 118 and a light emitting region 120. Some of the segments 116 have different cross-sectional shapes as other segments 116, as described herein. The segments 116 may alternate along the length such that adjacent segments 116 do not have the same cross-sectional shape. A representative sample of some of the segments 116 of the light guide 102 are labeled on FIG. 1.

The multiple light pipes 104 may be tubes that are formed from a light transmissive material and configured to transmit light therein. Each of the light pipes 104 are elongated between an attachment end 122 and an opposing distal end 124. The light pipes 104 may have a generally cylindrical shape, with a cross-section that is circular, oval, elliptical, or the like. The light pipes 104 may be solid, having an outer surface 126 and an interior region 128.

Figure 2:
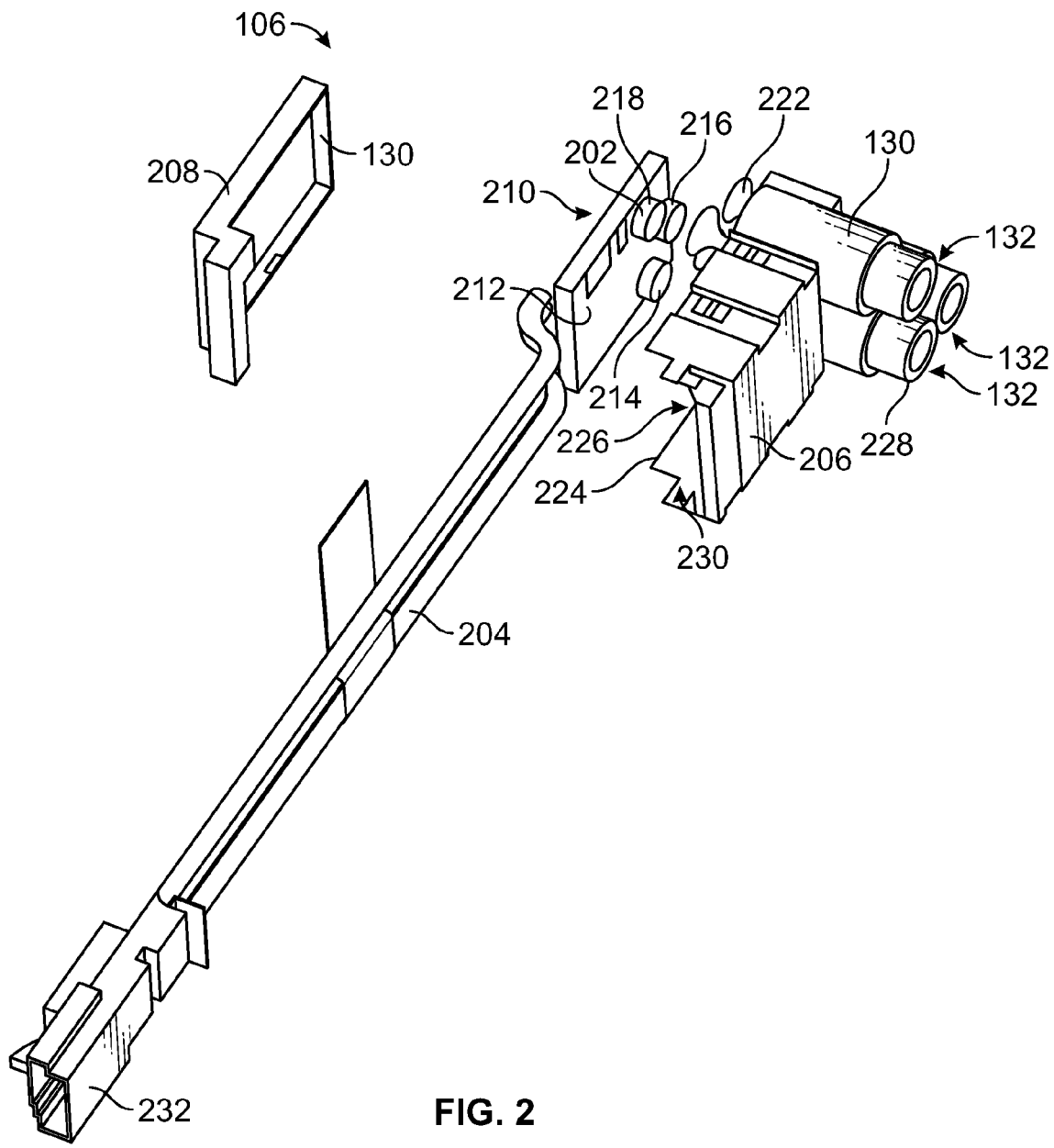
FIG. 2 is an exploded perspective view of a connector according to an embodiment of the light assembly of FIG. 1.

The connector 106 includes multiple light sources 202 (shown in FIG. 2). The light sources 202 are each configured to generate and emit light. For example, the light sources 202 may be light emitting diodes (LEDs). One or more of the LEDs may be tri-color red green blue (RGB) LEDs that are configured to emit red light, green light, blue light, and/or combinations thereof. In an exemplary embodiment, the light sources 202 are mounted within a housing 130. The housing 130 defines multiple channels 132 that are configured to receive the attachment ends 122 of the light pipes 104 therein. The attachment ends 122 of the light pipes 104 may be loaded into corresponding channels 132 of the housing 130 to mechanically couple the light pipes 104 to the housing 130.

In an exemplary embodiment, when the light pipes 104 are secured to the housing 130, each of the light sources 202 (shown in FIG. 2) within the housing 130 are optically coupled to the attachment end 122 of one of the light pipes 104. For example, a different light source 202 may be located within or proximate to each channel 132 of the housing 130, such that when a corresponding light pipe 104 is loaded into the channel 132, the light source 202 associated with that channel 132 optically couples to the attachment end 122 of the light pipe 104. As used herein, two objects are optically coupled when light emitted from one of the objects is received by the other object. The term optically coupled, as used herein, does not require that the objects be directly mechanically or chemically (e.g., by glue or other chemical adhesives) coupled to each other, but also does not preclude such mechanical connection. Each of the light sources 202 are optically coupled to a corresponding light pipe 104 such that light emitted by the light sources 202 is received by the corresponding light pipes 104. The light is received at the attachment ends 122 and transmitted through the interior regions 128 towards the distal ends 124. The light is transmitted through each light pipe 104 by internal reflection. The light transmitted within each light pipe 104 from the attachment end 122 is referred to as traveling in a general direction towards the distal end 124 although it is recognized that light rays impinge upon an edge (e.g., between the outer surface 126 and interior region 128) of the light pipe 104 at various angles, and some light may be emitted from the light pipe 104 prior to reaching the distal end 124.

The multiple light pipes 104 extend parallel to the longitudinal axis 110 of the light guide 102. The light pipes 104 are disposed proximate to the light receiving regions 118 of the segments 116. For example, when one of the light pipes 104 is illuminated (e.g., is receiving light generated by the corresponding light source 202 (shown in FIG. 2)), at least some of the light may be emitted from the light pipe 104 along its length and received at the light receiving region 118 of one or more of the segments 116. The light received at the light receiving region 118 may be directed through the light guide 102 towards the light emitting region 120 of the segment 116.

At least some of the light that reaches the light emitting region 120 is emitted from the light guide 102 through the light emitting region 120. Such emitted light illuminates a zone 136 or space that is external to the light emitting region 120. For example, the light emitting region 120 may be along a bottom side 134 of the light guide 102, and the light emitted through the light emitting region 120 illuminates the zone 136 below the bottom side 134 of the light guide 102. Alternatively, the bottom side 134 may be angled or oriented such that the light emitted through the light emitting region 120 illuminates a zone that is above or to a side of the light guide 102 instead of below the light guide 102. In an alternative embodiment, the light emitting region 120 may be along a different side of the light guide 102 or along an extension of the light guide 102 instead of along the bottom side 134. Each zone 136 is aligned axially with the corresponding segment 116 of the light guide 102 that provides the light that illuminates the zone 136. The size of the illuminated zone 136 depends on the dimensions of the light emitting region 120 of the segment 116, the luminance (e.g., luminosity, used herein to mean a measure of power or brightness) of the emitted light, and/or other characteristics. Although each zone 136 is axially aligned with the corresponding segment 116, the emitted light may be dispersed through the light emitting region 120 in multiple directions such that some of the light in adjacent zones 136 may overlap.

In an exemplary embodiment, adjacent segments 116 of the light guide 102 receive light from different light pipes 104 and emit such light from the light guide 102 through the respective light emitting regions 120 of the segments 116. The emitted light from the adjacent segments 116 illuminates adjacent zones 136. As such, light from one light pipe that is received by one segment 116 and emitted to illuminate one zone 136 may have different characteristics than light from a different light pipe 104 received by an adjacent segment 116 and emitted to illuminate an adjacent zone 136. Such different characteristics may include different colors (e.g., wavelengths), brightness, or other properties of the light. Therefore, as the light generated by the light sources 202 (shown in FIG. 2) differs in color, for example, those different colored lights are shown in the illuminated zones 136.

In operation, the light sources 202 (shown in FIG. 2) may be sequenced such that the light pipes 104 receive the light generated by the corresponding light sources 202 at different times. As a result, the adjacent segments 116 of the light guide 102 receive the light from the corresponding light pipes 104 at different times, and the light emitted from the light emitting regions 120 of the adjacent segments 116 illuminates the adjacent zones 136 at different times, creating a dynamic light effect. The dynamic light effect is created when the zones 136, which are spaced axially along the length of the light guide 102, are illuminated at different times. The light sources 202 may be sequenced such that zones 136 are illuminated in an order so the light appears to be traveling parallel to the longitudinal axis 110 towards and/or away from the second end 114 of the light guide 102. In addition, optical characteristics (e.g., wavelength, luminance, and the like) of the light that is generated by the light sources 202 may change over time. Therefore, multiple light pipes 104 may receive light generated by corresponding light sources 202 at the same time, but the optical characteristics of one or more of the lights may change over time to provide the dynamic light effect as the adjacent segments 116 of the light guide 102 receive and emit different lights over time. Furthermore, one or more of the light sources 202 may be controlled to generate light over a period of time without being sequenced in order to provide ambient lighting within an automobile, for example. Therefore, by controlling the characteristics of light emitted by the light sources 202 and the timing, the light assembly 100 may provide dynamic and/or static light effects of various colors and brightness.

The light assembly 100 may be used in various applications, such as automotive interior lighting, automotive exterior lighting, commercial lighting, household devices, and the like. The length of the light assembly 100 may be varied by changing the length of the light pipes 104 and/or light guide 102. Although the characteristics of the light generated by the light sources 202 (shown in FIG. 2) may be modified to account for a longer or shorter path through the light pipes 104, the addition or removal of light sources 202 is not required, unlike with known light assemblies that use lights along the length of the assembly to create the dynamic light effect.

FIG. 2 is an exploded perspective view of a connector 106 according to an embodiment of the light assembly 100 of FIG. 1. The connector 106 includes the housing 130, the light sources 202 within the housing 130, and power and/or communication wires 204 that provide power and/or control signals to the light sources 202 to control light generation. The housing 130 is formed as an assembly that includes a front shell 206 and a rear shell 208 (e.g., cover). As shown in FIG. 2, the front and rear shells 206, 208 are unassembled and separated, displaying the light sources 202 within.

The light sources 202 are operatively coupled to a light engine 210. The light engine 210 includes electronic control gear associated with the light sources 202, such as drivers. The light engine 210 controls one or more optical characteristics of the light generated by the light sources 202. For example, the light engine 210 may provide power to the light sources 202, as well as adjust the wavelength, luminous flux, and/or polarization of the light generated by the light sources 202. The light engine 210 may include a printed circuit board (PCB) 212. For example, the drivers and/or controllers (not shown) for the light sources 202 that control the light generated by the light sources 202 may be embedded on the PCB 212. The wires 204 may be fixed (e.g., soldered, glued, or mechanically fixed) to the PCB 212 to provide power and/or control signals to the light engine 210.

In an exemplary embodiment, the connector 106 includes three light sources 202—a first light source 214, a second light source 216, and a third light source 218—although greater or fewer than three light sources may be used in other embodiments. Each light source 202 is configured to individually generate light. The light sources 202 are electrically coupled to the PCB 212. Optionally, the light sources 202 are mounted on the PCB 212. In the illustrated embodiment, the light sources 202 are all mounted to the same PCB 212 of the light engine 210, but in other embodiments, the light sources 202 may be mounted and/or electrically coupled to different PCBs and/or may be part of different light engines. In an alternative embodiment, the light sources 202 may be thoughhole mounted to the housing 130 instead of being mounted directly to the PCB 212.

The light sources 202 may be LEDs. One or more of the light sources 202 may be RGB LEDs that emit red light, green light, blue light, or combinations thereof. For example, each of the three light sources 214-218 may be RGB LEDs. The light engine 210 controls the light sources 214-218 individually to produce three lights that may have different optical characteristics, such as wavelength (e.g., color), luminance, and the like. For example, the light engine 210 may control the first light source 214 to generate a red light, the second light source 216 to generate a green light, and the third light source 218 to generate a blue light. In another example, the light engine 210 may control each of the three light sources 214-218 to generate a different shade of a single color, such as red. Optionally, one or more of the light sources 202 may be a monochromatic LED, such as a white LED, that emits monochromatic white light. In alternative embodiments, light sources other than LEDs may be utilized.

The front shell 206 and rear shell 208 of the housing 130 may be formed of one or more insulating materials to provide electrical insulation for the electronic components, such as the light sources 202, the PCB 212, and associated circuitry within the assembled housing 130. For example, the shells 206, 208 may be composed of one or more plastic, rubber-like polymer, ceramic, glass, and/or the like. The shells 206, 208 optionally may be formed by a molding process. The front shell 206 and the rear shell 208 are configured to at least partially surround the light sources 202 when the rear shell 208 is assembled to the front shell 206. The front shell 206 includes the channels 132 that receive the light pipes 104 (shown in FIG. 1). The channels 132 extend through the front shell 206 and are configured to provide optical paths from the light sources 202 to the corresponding light pipes 104. The light sources 202 may be positioned within the front shell 206 and aligned with the corresponding channels 132 to provide linear optical paths to the light pipes 104. Optionally, lenses 222 may be positioned within the channels 132 or adjacent to the channels 132 between the light sources 202 and the corresponding light pipes 104. The lenses 222 may be formed of a clear light transmissive plastic material, such as polycarbonate and/or acrylic. The lenses 222 are configured to focus and/or collimate light rays from the light sources 202 towards the attachment ends 122 (shown in FIG. 1) of the corresponding light pipes 104. Alternatively, the light generated by the light sources 202 may be emitted directly into the light pipes 104 without the lenses 222.

During assembly, the rear shell 208 couples to a rear side 224 of the front shell 206, to define the housing 130. The housing 130 at least partially surrounds the light engine 210, including the light sources 202, within a pocket 226 created between the front and rear shells 206, 208. The light engine 210 may be mounted within the housing 130 using latches, adhesive, interference fits, and/or by configuring the pocket 226 to have tight tolerances around the light engine 210 such that the light engine 210 is fixed in place. The wires 204, connected at one end to the light engine 210, protrude from an opening 230 of the housing 130. The wires 204 at the other end may be terminated to a plug 232 for electrical mating with a device (not shown), which may provide power and/or control signals to the light engine 210. The attachment end 122 (shown in FIG. 1) of each light pipe 104 (shown in FIG. 1) is loaded into a channel 132 from a front side 228 of the front shell 206. The light pipes 104 may be retained within the channels 132 by an interference fit. Optionally, an adhesive and/or a mechanical latching feature may be used to retain the pipes 104 within the channels 132 to prohibit unintentional uncoupling of the light pipes 104 from the housing 130.

Figure 3:
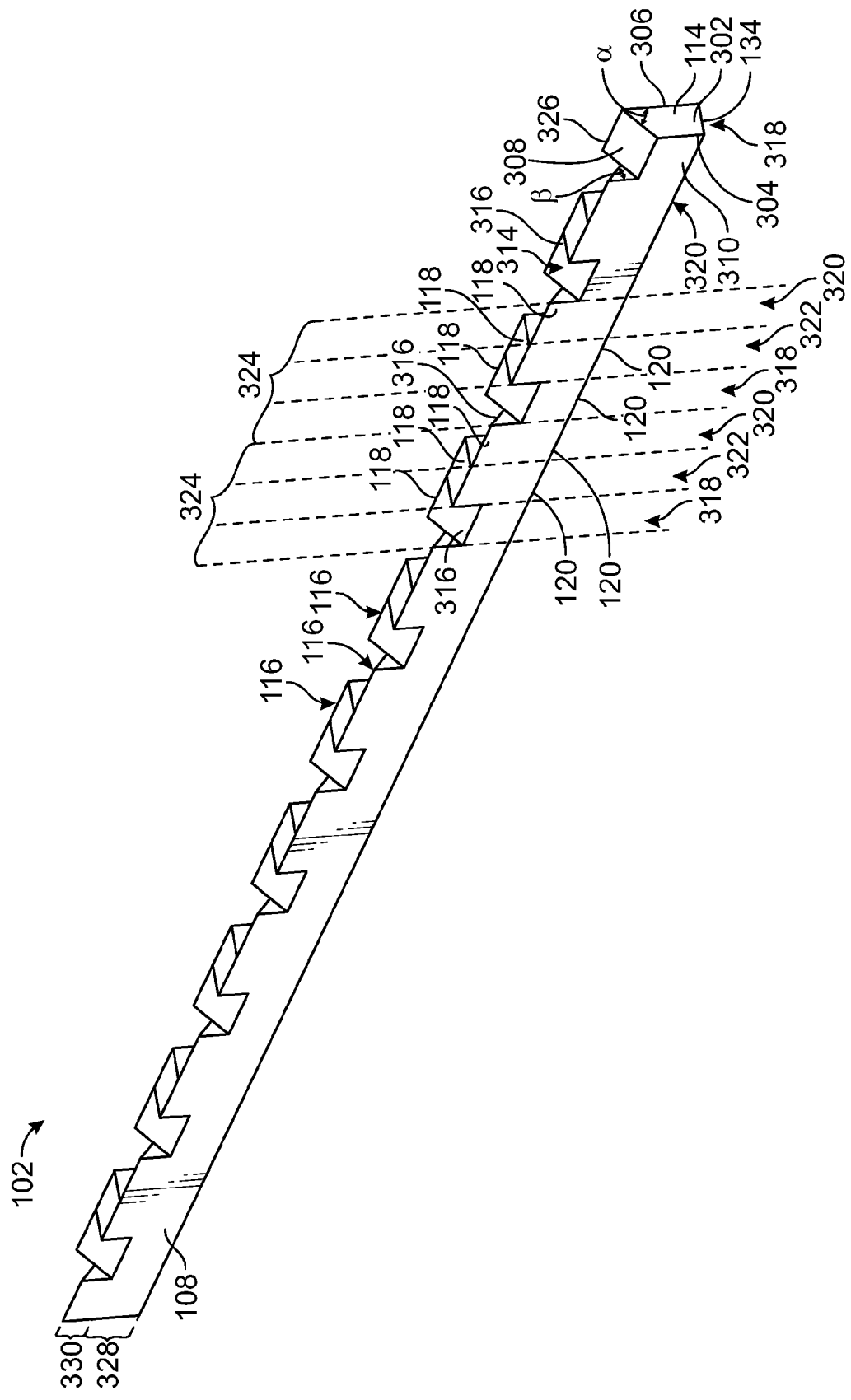
FIG. 3 is a perspective view of a light guide according to an embodiment of the light assembly of FIG. 1.

FIG. 3 is a perspective view of a light guide 102 according to an embodiment of the light assembly 100 of FIG. 1. The light guide 102 may be composed of a light transmissive material, such as acrylic and/or polycarbonate. The body 108 of the light guide 102 may be solid and clear, or at least translucent to allow the transmission of light within. The light guide 102 may be formed by a molding process, such as injection molding. The light guide 102 includes an interior region 302 surrounded by multiple sides 304. Optionally, the sides 304 and the interior region 302 may have the same composition, and the sides 304 are merely the edges of the interior region 302 at the interface between the light guide 102 and an exterior medium (e.g., air). In an embodiment, the body 108 of the light guide 102 may have an elongated generally-rectangular shape, having a right side 306, a top side 308, a left side 310, and a bottom side 134. The sides 306, 308, 310, and/or 134 may be planar, curved, and/or angled. In an alternative embodiment, the body 108 may include one or more extensions at one or more of the sides 134, 306, 308, 310. The terms right, top, left, and bottom are used merely to describe how the surfaces of the light guide 102 relate. It is recognized that during use, the light assembly 100 (shown in FIG. 1) and/or light guide 102 may be oriented in any direction, such that the bottom side 134 may face upwards, for example. The body 108 is referred to as being generally-rectangular in an exemplary embodiment because the top side 308 is not planar along the length of the light guide 102, but instead has multiple indentations 314 that provide uneven, angled surfaces 316. The angled surfaces 316 are associated with various segments 116 of the light guide 102.

The segments 116 include right-side segments 318, left-side segments 320, and top-side segments 322, identified as viewed from the second end 114 of the light guide 102. The right-side segments 318 have the light receiving region 118 generally along the right side 306 of the light guide 102. Likewise, the left-side segments 320 have the light receiving region 118 generally along the left side 310 of the light guide 102, and the top-side segments 322 have the light receiving region 118 generally along the top side 308, which correspond to the positions of the light pipes 104 (shown in FIG. 1) relative to the light guide 102. Optionally, all of the light receiving regions 118 may be positioned along the same side, such as along the top side 308, and the segments 318, 320, 322 may be shaped to receive and/or focus the light from the light pipes 104 into the light guide 102. Although the light receiving regions 118 of each of the different segments 318-322 are on different sides 304 of the light guide 102, the light emitting region 120 of each segment 318-322 is on the bottom side 134 in an exemplary embodiment.

The multiple segments 116 alternate along an axial length of the light guide 102. As shown in FIG. 3, the segments 116 alternate along the entire length of the light guide 102, although in other embodiments the segments 116 may not be defined along the entire length of the light guide 102 (e.g., such as at ends or corners if the light guide 102 has a bend). The segments 116 may be arranged in sets 324. For example, each set 324 has one right-side segment 318, one left-side segment 320, and one top-side segment 322. Multiple sets 324 may be formed adjacent to each other along the axial length of the light guide 102. Optionally, each set 324 may repeat the same pattern of segments 116 (e.g., right-side segment 318 then top-side segment 322 then left-side segment 320 in the direction from the first end to the second end 114, as shown in FIG. 3), or may vary the pattern from the adjacent set(s) 324. In alternative embodiments, the light guide 102 may have more or less than the three defined segments 318-322.

In an exemplary embodiment, the angled surfaces 316 defined by the indentations 314 at the top side 308 are present at the right-side segments 318 and the left-side segments 320, but not the top-side segments 322. For example, in both the right-side segments 318 and the left-side segments 320, the respective angled surfaces 316 are located opposite, and angled oblique to, the respective light receiving regions 118 thereof. For example, in the right-side segment 318, the light receiving region 118 may be a surface that is planar to (e.g., an extension of) the right side 306 of the light guide 102, and the angled surface 316 extends from a top edge 326 of the light receiving region 118 at an oblique angle to the light receiving region 118 at the right side 306 towards the left side 310 of the light guide 102. The oblique angle is an acute angle $\alpha$. The angle $\alpha$ may be approximately 45°. Optionally, the angle $\alpha$ may be greater or less than 45°. The angle $\alpha$ may depend at least partially on the angle that the light rays impinge upon the light receiving region 118 of the right-side segment 318 and/or the materials within the light guide 102 and the surrounding medium (e.g., air or water), which would affect the refractive properties of the light. The angled surface 316 is both adjacent to the light receiving region 118 as well as opposite to the light receiving region 118, since a line normal to the surface of the light receiving region 118 of the right-side segment 318 intersects the angled surface 316.

The left-side segments 320, in an exemplary embodiment, are similar to the right-side segments 318, but face in the opposite direction to the right-side segments 318. For example, the left-side segments 320 have an oblique angle $\beta$ between the light receiving region 118 along the left side 310 of the light guide 102 and the respective angled surface 316 which may be 45°, or optionally more or less than 45°. The respective angled surface 316 is both opposite to and also adjacent to the light receiving region 118 of the left-side segment 320. The top-side segments 322, however, do not have angled surfaces 316 that are oblique to the respective light receiving regions 118. There are no indentations 314 at the top side 308 along the top-side segments 322. In an exemplary embodiment, the light receiving regions 118 of the top-side segments 322 may extend parallel to the light emitting region 120 at the bottom side 134 of the light guide 102. For example, the light receiving region 118 of the top-side segment 322 may be orthogonal to the right and left sides 306, 310 of the light guide.

In an exemplary embodiment, the light guide 102 has a rectangular base region 328 and a cap region 330. The base region 328 includes the bottom side 134 of the light guide 102 and the cap region 330 includes the top side 308, such that the cap region 330 is above the base region 328. Optionally, the base region 328 may be a continuous rectangular block with planar sides along the length of the light guide 102, such that there are no indentations or gaps in the base region 328, however other shapes are possible in alternative embodiments. The cap region 330, however, is not continuous or planar along the length of the light guide 102, but includes the indentations 314 and the various angled surfaces 316 of the segments 116. Thus, in an embodiment, the only division between adjacent segments 116 is at the cap region 330. In other embodiments, the base region 328 may include segmenting features to provide division between adjacent segments 116. Optionally, the cap region 330 may include indentations or concave areas that receive the light pipes 104 (shown in FIG. 1). For example, the concave areas may have a similar curvature to the curvature of the light pipe 104 to increase the surface area of contact between the light pipes 104 and the light guide 102.

Figure 4:
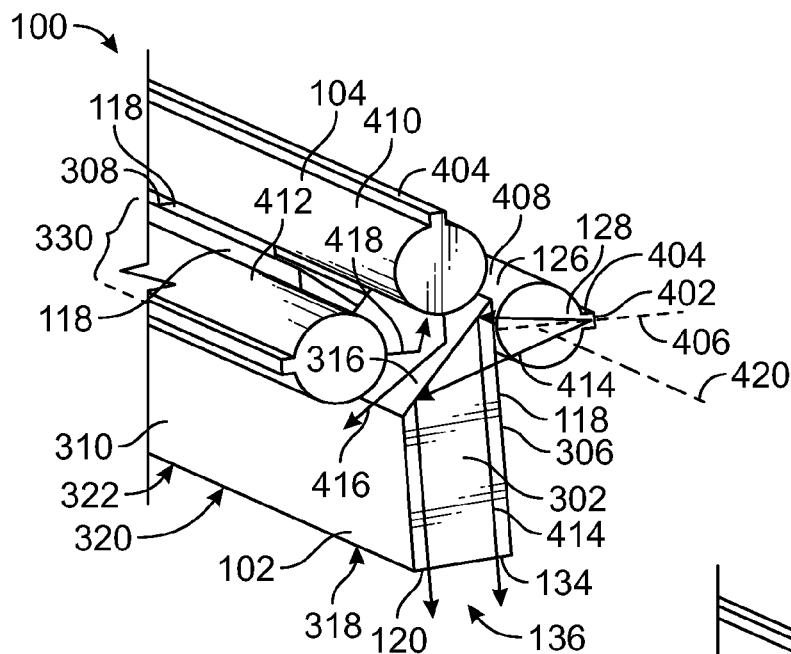
FIG. 4 shows a cross-section of an embodiment of the light assembly of FIG. 1.

FIG. 4 shows a cross-section of an embodiment of the light assembly 100 of FIG. 1. The multiple light pipes 104 are disposed along the light guide 102. The light pipes 104 may be composed of a light transmissive material, such as acrylic and/or polycarbonate. The light pipes 104 may be solid and clear, or at least translucent, to allow the transmission of light within through the interior region 128. The light pipes 104 may be formed by a molding process, such as injection molding, by an extrusion process, or the like. The light pipes 104 may be generally cylindrical in shape, having a circular or elliptical cross-section. Although the light pipes 104 are shown in FIG. 1 as linear along the length of the light assembly 100, the light pipes 104 in alternative embodiments, may have at least one bend or curve. The material and shape of the light pipes 104 permits light generated by the light sources 202 (shown in FIG. 2) to propagate through the light pipes 104 via internal reflection.

In an exemplary embodiment, at least one of the light pipes 104 includes a reflective surface 402 integral to or added to the light pipe 104 that directs light in a defined direction which causes at least some light to emit from the light pipe 104. Light travels along the light pipe 104 because of total internal reflection. The reflective surface 402 reflects and/or scatters the light in a way that interferes with the total internal reflection, thereby causing light to be emitted before reaching the distal end 124 (shown in FIG. 1) of the light pipe 104. For example, the reflective surface 402 may be configured to direct light in a direction transverse to a pipe axis 420 such that light is emitted from the light pipe 104 towards the light guide 102.

The reflective surface 402 may be one or more surfaces within an external projection 404 (e.g., bead) that protrudes radially from the tubular light pipe 104 and extends axially along a length of the light pipe 104. The external projection 404 may be coextruded or co-molded with the light pipe 104 such that the projection 404 is integral to the light pipe 104. The entire projection 404 may be reflective or the projection 404 may only have one or more reflective surfaces 402 that direct the light towards the interior 128 of the light pipe 104 (e.g., opposite to the external projection 404). The light may be directed generally along a protruding axis 406 of the projection 404, and at least some of the light along the protruding axis 406 may refract through the surface 126 of the light pipe 104 and be emitted from the light pipe 104. The external projection 404 may also be used to align and/or couple the light pipe 104 with the connector 106 (shown in FIG. 1). Optionally, the reflective surface 402 may be a reflective element or coating that reflects light towards the light pipe 104. The reflective element may be over-molded onto the external projection 404 or formed within or proximate to the external projection 404, such as by coextruding the reflective element with the light pipe 104. In an alternative embodiment, one or more of the light pipes 104 may include a reflective element within or on the light pipe 104 without having an external projection 404.

In an exemplary embodiment, the light assembly 100 includes three light pipes 104—a first light pipe 408, a second light pipe 410, and a third light pipe 412. The first light pipe 408 is mounted along the right side 306 of the light guide 102. The second light pipe 410 is mounted along the top side 308 of the light guide 102. The third light pipe 412 is mounted along the left side 310 of the light guide 102. The light pipes 408-412, in an embodiment, are non-coplanar. The first and third light pipes 408, 412 may be mounted more proximate to the bottom side 134 than the second light pipe 410 at the top side 308. The light pipes 408-412 may be mounted directly to the light guide 102 using adhesives (e.g., glue) or mechanical fasteners. Alternatively, the light pipes 408-412 may be mounted indirectly to the light guide 102 by a cover or housing (not shown) that holds the light pipes 408-412 in contact with or proximate to the light guide 102. The light pipes 408-412 may be mounted at the cap region 330, such that the first light pipe 408 is adjacent to the light receiving region 118 of the right-side segment 318, the second light pipe 410 is adjacent to the light receiving region 118 of the top-side segment 322, and the third light pipe is adjacent to the light receiving region 118 of the left-side segment 320. As such, light emitted from the first light pipe 408 is received at the light receiving region 118 of the right-side segments 318. In addition, light emitted from the second light pipe 410 and third light pipe 412 is received by the corresponding top-side segments 322 and left-side segments 320, respectively.

Turning now to the trapezoidal cross-section of the right-side segment 318 shown in FIG. 4, at least some of the light rays 414 transmitted through the first light pipe 408 may be directed by the reflective surface 402 in a direction transverse to the length of the light pipe 408 towards the light receiving region 118 of the right-side segment 318. The light rays 414 may be emitted by the light pipe 408 and received at the light receiving region 118. For example, the incident angle of the light rays 414 may be less than the critical angle at the surface 126 of the light pipe 408 and the right side 306 of the light guide 102 such that the light rays 414 refract through both interfaces and into the interior region 302 of the light guide 102. The critical angle is the angle of incidence, measured from the line normal to the surface boundary, above which internal reflectance occurs. Generally, an incident angle above the critical angle will internally reflect, while an incident angle less than the critical angle will refract through the surface boundary.

At least some of the light rays 414 within the interior region 302 may impinge upon the angled surface 316 of the right-side segment 318. Due to the oblique angle α (shown in FIG. 3) of the surface 316, the incident angle of the light rays 414 may be greater than the critical angle at the surface 316, so the light rays 414 may be internally reflected instead of externally refracted. The angled surface 316 may direct the light rays 414 towards the light emitting region 120 at the bottom side 134 of the light guide 102. At least some of the light rays 414 that impinge the bottom side 134 may have an incident angle less than the critical angle, so the light rays 414 refract through the bottom side 134 and are emitted from the light emitting region 120. The emitted light rays 414 may illuminate the zone 136 below the right-side segment 318.

In an exemplary embodiment, at least some of the light rays 416, 418 that are emitted from the second and third light pipes 410, 412, respectively, in the direction toward the light guide 102 may impinge upon the angled surface 316 of the right-side segment 318 instead of the light receiving region 118. At least some of the light rays 416, 418 may have an angle of incidence that is greater than the critical angle at the angled surface 316, so the light rays 416, 418 are externally reflected without entering the right-side segment 318. Therefore, the light emitted through the light emitting region 120 of the right-side segment 318 is substantially only the light emitted from the first light pipe 408. The first light pipe 408 may be optically coupled to the first light source 214 (shown in FIG. 2). As such, the light generated at the first light sources 214 is substantially the light that illuminates the zone 136 below the right-side segment 318. Since the light guide 102 in an exemplary embodiment includes multiple right-side segments 318 along a defined length, the light from the first light source 214 may illuminate each of the zones 136 associated with the right-side segments 318, while the light generated by the second and third light sources 216, 218 (shown in FIG. 2) and transmitted by the second and third light pipes 410, 412, respectively, has little to no presence is in these illuminated zones 136.

Optionally, one or more of the light pipes 104 may include a reflective layer (not shown) along various axial portions of the length of the light pipes 104 to prohibit light from being emitted at undesired locations. For example, the second and/or third light pipes 410, 412 may include such a reflective layer at portions of the light pipes 410, 412 aligned with the right-side segments 318. As described above, the light that impinges upon the angled surface 316 of the right-side segments 318 from these light pipes 410, 412 is mostly externally reflected without being used to illuminate a zone 136, so this light is lost. The reflective layer may reflect light rays that are directed towards the light guide 102 back towards the interior 128 of the light pipes 410, 412 to prohibit the light rays from being emitted at that axial location. The light is preserved within the light pipes 410, 412, instead of being lost. The light rays may be emitted at a more distal location where the reflective layer is absent, such as proximate to a top-side segment 322 or a left-side segment 320, where the light may be received by the light guide 102.

Figure 5:
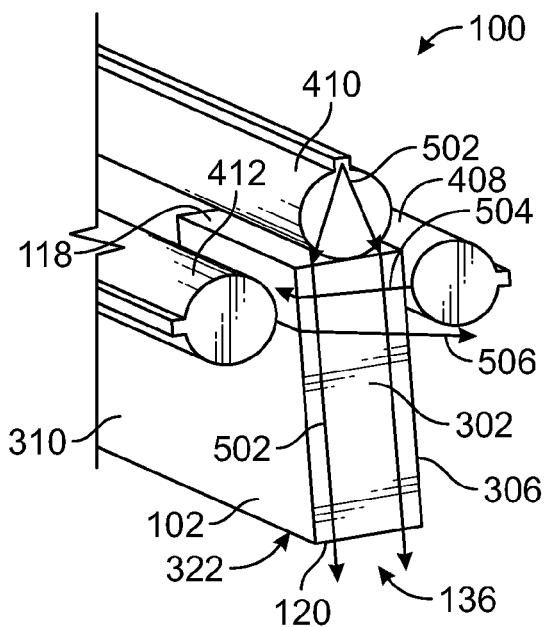
FIG. 5 shows another cross-section of an embodiment of the light assembly of FIG. 1.

FIG. 5 shows another cross-section of an embodiment of the light assembly 100 of FIG. 1. The cross-section in FIG. 5 extends through the top-side segment 322 of the light guide 102. The top-side segment 322 in an exemplary embodiment has a rectangular cross-section, such that the light receiving region 118 is parallel to the light emitting region 120. The light receiving region 118 receives light rays 502 that are emitted towards the light guide 102 by the second light pipe 410. The light rays 502 have an incident angle that is less than the critical angle at the light receiving region 118, so the light rays 502 refract and are received in the interior region 302 of the top-side segment 322. At least some of the light rays 502 are directed through the light guide 102 to the light emitting region 120, through which the light rays 502 refract and are emitted from the light guide 102 to illuminate the corresponding zone 136. In an exemplary embodiment, the second light pipe 410 is optically coupled to the second light source 216 (shown in FIG. 2), such that light generated by the second light source 216 illuminates the zones 136 associated with the top-side segments 322.

The top-side segment 322 may be different than the right-side segment 318 described in FIG. 4 because at least some light emitted by the other light pipes 408, 412 that impinges upon the right and left sides 306, 310, respectively, may refract through the sides 306, 310 and enter the interior region 302 of the top-side segment 322 instead of being externally reflected at the surfaces of the sides 306, 310. For example, light rays 504 from the first light pipe 408 may be refracted through the interior region 302 and emitted through the left side 310 of the light guide 102, and light rays 506 from the third light pipe 412 may be refracted through the interior region 302 and emitted through the right side 306 of the light guide 102. Therefore, although the light rays 504, 506 may not be externally reflected, at least most of the light rays 504, 506 are not directed towards the light emitting region 120. As such, at least most of the light generated by the first and third light sources 214, 218 (shown in FIG. 2) and transmitted by the first and third light pipes 408, 412 has little to no presence in the zones 136 below the top-side segment 322. Optionally, the first and/or third light pipes 408, 412 may include reflective layers along axial portions proximate to the top-side segments 322 in order to prohibit light generated by the first and/or third light sources 214, 218 from being lost externally.

Figure 6:
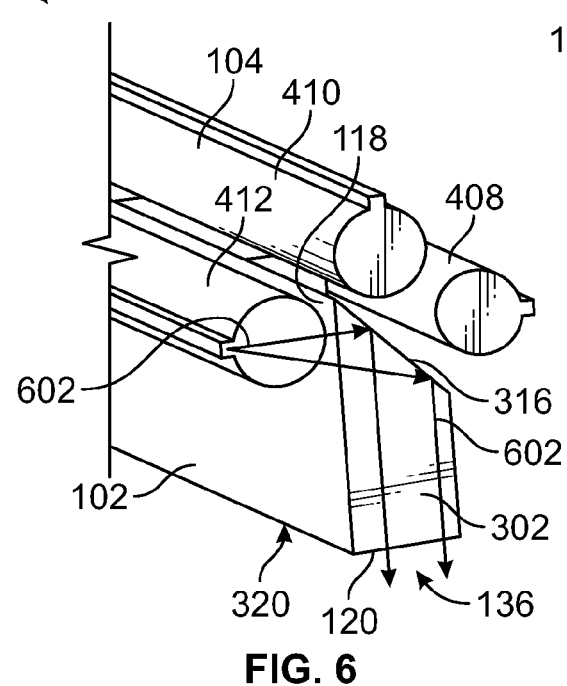
FIG. 6 shows a further cross-section of an embodiment of the light assembly of FIG. 1.

FIG. 6 shows a further cross-section of an embodiment of the light assembly 100 of FIG. 1. The cross-section in FIG. 6 extends through the left-side segment 320 of the light guide 102. The left-side segment 320 in an exemplary embodiment has a trapezoidal cross-section, like the right-side segment 318 (shown in FIG. 4), such that the light receiving region 118 is transverse to the light emitting region 120. The light receiving region 118 receives light rays 602 that are emitted towards the light guide 102 by the third light pipe 412. The light rays 602 enter the light receiving region 118 by refraction, and are internally reflected by the angled surface 316 towards the light emitting region 120. The light 602 is emitted through the light emitting region 120 and illuminates the zone 136 below the left-side segment 320. The third light pipe 412 may be optically coupled to the third light source 218 (shown in FIG. 2), so the light rays 602 that illuminate the zone 136 are generated by the third light source 218. Like the right-side segments 318, at least most of the light emitted by the other light pipes impinges upon the angled surface from the outside and externally reflects away from the light guide 102 without being received within the interior region 302. Optionally, the first and/or second light pipes 408, 410 may include reflective layers along portions axially aligned with the left-side segments 320 to prohibit light from being emitted and lost due to external reflection at those axial locations.

Referring now to FIGS. 4-6, the light assembly 100 may be configured such that the zones 136 aligned with the right-side segments 318 are illuminated primarily with the light generated by the first light source 214 (shown in FIG. 2) and transmitted by the first light pipe 408. The zones 136 aligned with the top-side segments 322 are illuminated primarily with the light generated by the second light source 216 (shown in FIG. 2) and transmitted by the second light pipe 410. The zones 136 aligned with the left-side segments 320 are illuminated primarily with the light generated by the third light source 218 (shown in FIG. 2) and transmitted by the third light pipe 412. The light sources 214-218 may be controlled to generate different lights (e.g., different colors, luminosity, or other light properties) and/or to generate light at different times (e.g., in a sequence). For example, by controlling each light source 214-218 to generate a light that is different from the other lights and to sequence the generation of the lights, the light assembly 100 may create a dynamic light effect that illuminates the zones 136 along the length of the light assembly with different colored lights (or different shades of the same color) at different times. The light assembly 100 may be controlled to produce numerous different lighting effects, while only requiring the three light sources 214-218 instead of numerous light sources along the length. In alternative embodiments, the light assembly 100 may be adjusted (by altering the light guide 102, number of light pipes 104, and/or number of light sources 202 (shown in FIG. 2)) to provide more or less than three segments 318-322 and associated illuminated zones 136 to provide different dynamic lighting effects.

Figure 7:
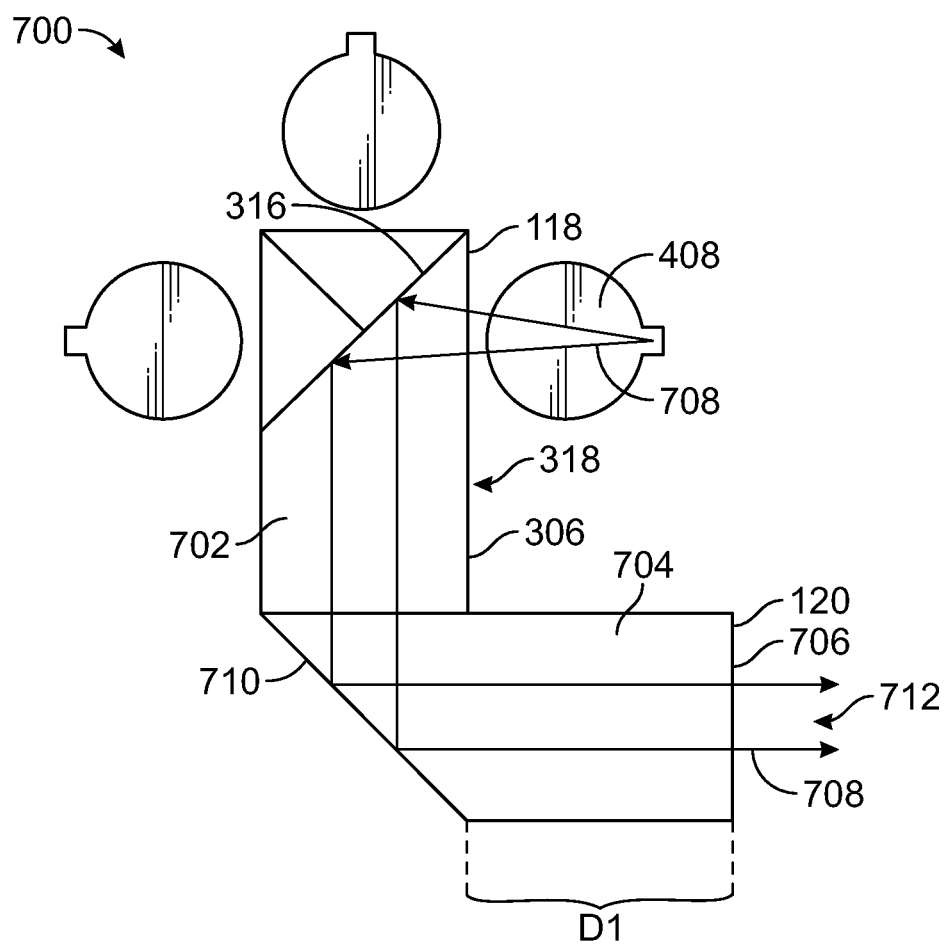
FIG. 7 shows a cross-section of an alternative embodiment of the light assembly shown in FIG. 1.

FIG. 7 shows a cross-section of an alternative embodiment of the light assembly 100 shown in FIG. 1. The light assembly 700 shown in FIG. 7 may be similar to the light assembly 100 except for the shape of the light guide 702. The light guide 702 includes an extension 704 that protrudes from the right side 306 of the guide 702 a distance D1. The light emitting region 120 of the light guide 702 may be located along a right side 706 of the extension 704 instead of along the bottom side 134 (shown in FIG. 1) of the light guide 102.

FIG. 7 shows a cross-section of a right-side segment 318 of the light guide 702. When the first light pipe 408 is illuminated, at least some light rays 708 may be received through the light receiving region 118 and internally reflected by the angled surface 316 similarly to the path of the light rays 414 shown in FIG. 4. However, instead of refracting through the light emitting region 120 at the bottom side 134 and illuminating a zone 136 that is below the bottom side 134 as shown in FIG. 4, the light rays 708 may be directed in a different direction by a second angled surface 710. The second angled surface 710 internally reflects at least some of the light rays 708 into the extension 704 towards the light emitting region 120 at the right side 706 thereof. At least some of the light rays 708 may be emitted from the light emitting region 120 such that the light illuminates a zone 712 to the right of the light guide 702. Light received at the corresponding light receiving regions 118 of the left-side regions 320 (shown in FIG. 6) and the top-side regions 322 (shown in FIG. 5) may be directed through the light guide 702 by the second angled surface 710 such that the light is emitted through corresponding light emitting regions 120 at the right side 706 of the extension 704 as well. Therefore, by sequencing the light sources 202 (shown in FIG. 2), a dynamic light effect may be provided to the right of the light guide 702.

Alternatively, the light guide 702 may have one or more curved surfaces (not shown) instead of or in addition to the first and second angled surfaces 316, 710. The light rays 708 may internally reflect along the curved surfaces towards the light emitting region 120. For example, the light guide 702 may have a curved "J"-shape instead of an angular "L"-shape. FIG. 7 illustrates one example of how the light guide of the light assembly described herein may be shaped to direct light in selected directions, path lengths, and the like by internal reflection while maintaining segments that allow for dynamic light effects external to light emitting regions of the segments.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A light assembly comprising:
a light guide having an elongated body extending along a longitudinal axis between a first end and an opposing second end, the light guide including multiple segments that are arranged axially along a length of the body between the first and second ends, the segments alternate along the length, each segment having a light receiving region and a light emitting region, the light guide configured to receive light in the light guide through the light receiving regions of the segments and configured to emit light from the light guide through the light emitting regions of the segments, the body of the light guide including a top side, a bottom side, a left side, and a right side, the segments comprising right-side segments, left-side segments, and top-side segments, the light receiving region of the right-side segments defined along the right side, the light receiving region of the left-side segments defined along the left side, the light receiving region of the top-side segments defined along the top side, the right-side segments each having an angled surface extending from the right side to the left side at an oblique angle relative to the right side, the left-side segments each having an angled surface extending from the left side to the right side at an oblique angle relative to the left side, the angled surfaces of the right-side segments and the angled surfaces of the left-side segments configured to reflect light that is within the light guide toward the respective light emitting regions of the segments, the angled surfaces of the right-side segments and the angled surfaces of the left-side segments being planar;
multiple light pipes that are each elongated between an attachment end and an opposing distal end, the light pipes disposed along the light receiving regions of the light guide and extend parallel to the longitudinal axis; and
multiple light sources configured to emit light, each light source optically coupled to the attachment end of a corresponding one of the light pipes, the light emitted by each light source received by the corresponding light pipe at the attachment end and transmitted through the light pipe towards the distal end;
wherein adjacent segments of the light guide receive light from different light pipes and emit the light from the light guide through the respective light emitting regions of the adjacent segments.

2. The light assembly of claim 1, wherein the light emitting regions of the segments are defined along the bottom side of the body of the light guide.

3. The light assembly of claim 1, wherein the multiple segments are arranged in sets, each set having one of the right-side segments, one of the left-side segments, and one of the top-side segments.

4. The light assembly of claim 1, wherein the light emitted through the light emitting regions of adjacent segments illuminates zones external to the light emitting regions and axially aligned with the corresponding segments.

5. The light assembly of claim 1, wherein the light pipes comprise first, second, and third light pipes being non-coplanar, the first light pipe is mounted along the right side of the light guide, the second light pipe is mounted along the top side of the light guide, and the third light pipe is mounted along the left side of the light guide.

6. The light assembly of claim 1, wherein at least one of the light pipes includes a reflective surface configured to direct light in a direction transverse to a pipe axis such that the light is emitted from the light pipe towards the light guide.

7. The light assembly of claim 1, wherein the light sources are mounted in a housing, the housing defining multiple channels configured to receive the attachment ends of the light pipes therein to couple the light pipes to the housing.

8. The light assembly of claim 1, wherein the light sources are light emitting diodes (LEDs).

9. The light assembly of claim 1, wherein the light emitting regions of adjacent segments are continuous and are located at the bottom side of the light guide.

10. The light assembly of claim 1, wherein, along the right-side segments, the right side of the body of the light guide is taller relative to the bottom side than the left side, the angled surface of each right-side segment extending from a top edge of the right side of the body to a top edge of the left side of the body.

11. The light assembly of claim 1, wherein, along the left-side segments, the left side of the body of the light guide is taller relative to the bottom side than the right side, the angled surface of each left-side segment extending from a top edge of the left side of the body to a top edge of the right side of the body.

12. A light assembly comprising:
a light guide having an elongated body extending along a longitudinal axis between a first end and an opposing second end, the light guide including multiple segments that are arranged axially along a length of the body between the first and second ends, the segments include right-side segments, left-side segments, and top-side segments that alternate along the length, each segment having a light receiving region and a light emitting region, the light guide configured to receive light in the light guide through the light receiving regions of the segments and configured to emit light from the light guide through the light emitting regions of the segments, the right-side segments having the light receiving region along a right side of the light guide, the left-side segments having the light receiving region along a left side of the light guide, and the top-side segments having the light receiving region along a top side of the light guide, the light emitting regions of adjacent segments being continuous and located along a bottom side of the light guide, and
multiple light pipes that are each elongated between an attachment end and an opposing distal end, the light pipes disposed along the light receiving regions of the light guide and extend parallel to the longitudinal axis, the light pipes each receive light generated by a different light source at the attachment end and transmit the light through the light pipe towards the distal end,
wherein adjacent segments of the light guide receive light from different light pipes and emit the light from the light guide through the respective light emitting regions of the adjacent segments.

13. The light assembly of claim 12, wherein, along the right-side segments, the right side of the light guide is taller relative to the bottom side than the left side, and, along the left-side segments, the left side of the body of the light guide is taller than the right side.

14. The light assembly of claim 12, wherein the right-side segments receive light from a first light pipe that is mounted along the right side of the light guide, the top-side segments receive light from a second light pipe that is mounted along the top side of the light guide, and the left-side segments receive light from a third light pipe that is mounted along the left side of the light guide, the first, second, and third light pipes being non-coplanar.

15. The light assembly of claim 12, wherein the right-side segments have an angled surface opposite, and angled oblique to, the light receiving region thereof and the left-side segments have an angled surface opposite, and angled oblique to, the light receiving region thereof, the angled surfaces directing the light toward the corresponding light emitting regions.

16. The light assembly of claim 15, wherein the right-side segments receive light from one of the light pipes that is mounted along the right side of the light guide, the light enters the light receiving region and is internally reflected by the angled surface of the right-side segment towards the light emitting region, wherein light emitted by a different light pipe that is mounted along the left side or the top side of the light guide is externally reflected by the angled surface of the right-side segment without entering the right-side segment.

17. The light assembly of claim 15, wherein the left-side segments receive light from one of the light pipes that is mounted along the left side of the light guide, the light enters the light receiving region and is internally reflected by the angled surface of the left-side segment towards the light emitting region, wherein light emitted by a different light pipe that is mounted along the right side or the top side of the light guide is externally reflected by the angled surface of the left-side segment without entering the left-side segment.

18. The light assembly of claim 12, wherein the light emitted through the light emitting regions of adjacent segments illuminates respective zones below the bottom side of the light guide, the zones axially aligned with the corresponding segments above.

19. The light assembly of claim 12, wherein the multiple segments are arranged in sets, each set having one of the right-side segments, one of the left-side segments, and one of the top-side segments.

20. The light assembly of claim 12, wherein the right-side segments have an angled surface directly connected to the light receiving region along the right side, and extending linearly at an oblique angle relative to the light receiving region to the opposite left side of the light guide, the left-side segments having an angled surface directly connected to the light receiving region along the left side, and extending linearly at an oblique angle relative to the light receiving region to the opposite right side of the light guide, the angled surfaces of the right-side segments and the angled surfaces of the left-side segments being configured to reflect light that is within the light guide toward the respective light emitting regions of the segments.

* * * * *